(12) United States Patent
Wengrovitz

(10) Patent No.: US 8,150,450 B1
(45) Date of Patent: Apr. 3, 2012

(54) SYSTEM AND METHOD FOR TWO-WAY RADIO AND TELEPHONE CONFERENCING AND COLLABORATION

(75) Inventor: Michael S. Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 794 days.

(21) Appl. No.: 11/733,982

(22) Filed: Apr. 11, 2007

Related U.S. Application Data

(60) Provisional application No. 60/885,278, filed on Jan. 17, 2007, provisional application No. 60/745,817, filed on Apr. 27, 2006, provisional application No. 60/744,646, filed on Apr. 11, 2006.

(51) Int. Cl.
*H04M 1/00* (2006.01)

(52) U.S. Cl. ............... 455/550.1; 455/416; 455/518

(58) Field of Classification Search .......... 455/512–521, 455/3.05, 3.06, 416, 127.4, 95, 550.1, 553.1
See application file for complete search history.

(56) References Cited

U.S. PATENT DOCUMENTS

| | | | |
|---|---|---|---|
| 5,583,925 A | | 12/1996 | Bernstein |
| 6,178,237 B1 | | 1/2001 | Horn |
| 6,501,739 B1 | | 12/2002 | Cohen |
| 6,973,166 B1 | * | 12/2005 | Tsumpes ............... 379/45 |
| 7,768,999 B1 | * | 8/2010 | Dhanoa et al. ............... 370/352 |
| 2005/0069114 A1 | * | 3/2005 | Eran ............... 379/202.01 |
| 2005/0094579 A1 | * | 5/2005 | Acharya et al. ............... 370/260 |
| 2006/0189337 A1 | * | 8/2006 | Farrill et al. ............... 455/518 |
| 2006/0212379 A1 | | 9/2006 | Perg et al. |
| 2007/0033251 A1 | * | 2/2007 | Mandalia et al. ............... 709/204 |
| 2007/0239885 A1 | * | 10/2007 | Vadlakonda et al. ......... 709/232 |

FOREIGN PATENT DOCUMENTS

| | | |
|---|---|---|
| DE | 010138102 A1 | 2/2003 |
| DE | 010224905 A1 | 2/2003 |
| EP | 0713319 A | 5/1996 |
| EP | 1505815 A | 2/2005 |
| EP | 1526706 A | 4/2005 |

OTHER PUBLICATIONS

International Search Report dated Dec. 16, 2008.
International Search Report and Written Opinion mailed Mar. 5, 2008.
EP Search Report dated Nov. 12, 2008.
International Preliminary Report on Patentability dated Nov. 19, 2009.

* cited by examiner

*Primary Examiner* — Jean Gelin
*Assistant Examiner* — Michael Nguyen
(74) *Attorney, Agent, or Firm* — Garlick Harrison & Markison

(57) ABSTRACT

Conferencing between two-way radio devices and telephone devices is achieved using a conference server that has a radio interface coupled to a radio network including one or more two-way radio devices and a telephone interface coupled to a telephone network including one or more telephone devices. A conference room within the conference server manages a conference call between the two-way radio devices and telephone devices by receiving voice streams originated by the two-way radio devices and telephone devices during the conference call and transmitting the received voice streams originated by the two-way radio devices and telephone devices to the remaining devices involved in the conference call.

27 Claims, 10 Drawing Sheets

SYSTEM AND METHOD FOR TWO-WAY RADIO AND TELEPHONE CONFERENCING AND COLLABORATION

CROSS-REFERENCE TO RELATED APPLICATIONS

This U.S. Nonprovisional Application for Patent claims the benefit of the filing date of U.S. Provisional Patent Application entitled, SYSTEM AND METHOD FOR RADIO AND TELEPHONE CONFERENCING/COLLABORATION FOR HOMELAND SECURITY, FIRST-RESPONDER AND OTHER APPLICATIONS, having Ser. No. 60/744,646, filed on Apr. 11, 2006, which is incorporated herein by reference for all purposes.

This U.S. Nonprovisional Application for Patent further claims the benefit of the filing date of U.S. Provisional Patent Application entitled, SYSTEM AND METHOD FOR RADIO AND TELEPHONE CONFERENCING/COLLABORATION FOR HOMELAND SECURITY, FIRST-RESPONDER AND OTHER APPLICATIONS, having Ser. No. 60/745,817, filed on Apr. 27, 2006, which is incorporated herein by reference for all purposes.

This U.S. Nonprovisional Application for Patent further claims the benefit of the filing date of U.S. Provisional Patent Application entitled, GENERALIZED PUSH-TO-TALK AND PUSH-TO-CONFERENCE, having Ser. No. 60/885,278, filed on Jan. 17, 2007, which is incorporated herein by reference for all purposes.

BACKGROUND OF THE INVENTION

1. Technical Field of the Invention

The present invention relates in general to communications systems, and in particular, to conferencing systems for creating and managing conference calls.

2. Description of Related Art

Over the past several years, push-to-talk services have been introduced to consumers by carriers and service providers. In the typical scenario, a consumer subscribing to a push-to-talk service is provided with a special cellular telephone device (hereinafter referred to as a two-way radio device) by the carrier. To communicate with another push-to-talk subscriber, the consumer depresses a push-to-talk button on the two-way radio. The consumer's voice is immediately heard by the other subscriber. The advantage of such a push-to-talk service is the elimination of various delays associated with call setup, including dialing, ringing and answering. The operation is analogous to land mobile radio users who communicate using "walkie-talkies", except that the voice is carried by the cellphone service provider's network instead of the radio channel itself.

Also over the past several years, multi-party voice conference services have become common in the marketplace. Voice conferencing services enable three or more parties on different telephone devices to participate in a single call. Traditionally, such conferencing services were provided by a private branch exchange (PBX) or local exchange carrier (LEC) that allowed a conference call originator to manually dial the other parties of the conference call, place them on "hold" and then patch them together by simultaneously releasing the holds.

More recently, conference bridges have been developed that are able to combine multimedia communications from multiple telephone devices in a multi-party conference call. A conference bridge may be located within a public or private network and may be implemented on a single (central conference bridge) switch or multiple switches. In conference bridge applications, the conference originator may reserve a certain number of connections (i.e., ports) on a conference bridge by manually interacting with an operator of the conference bridge or by interacting with an automated conferencing bridge system. Once the conference originator has reserved the requisite number of ports on the bridge, the conference originator provides each participant with a dial-in telephone number and access code for the conference bridge and an access code for entering the conference call. To join the conference call, each participant must dial the dial-in telephone number for the conference bridge, and when prompted, enter the access code for the conference call.

Two-way radio services and conference services are used in a number of different applications, but have particular importance in emergency situations. Recent catastrophes such as 911, Katrina and Rita have demonstrated the urgent need for effective voice and data communication between various emergency workers and teams. For example, fire department personnel, using one type of two-way radio, must be able to communicate with police, using a second type of two-way radio, along with other officials using telephone devices (i.e., cellular telephones, PSTN or PBX telephones or Voice over IP (VoIP) telephones) to discuss the nature of the emergency and the proper course of action.

However, conventional conference bridges only support the joining of telephone devices in a conference call, and not two-way radio. Therefore, either the police/firemen must maintain a telephone device to communicate with the other officials or the other officials must maintain a two-way radio device to communicate with the police and firemen. This is inconvenient and also may not provide adequate or effective communication. There is currently no mechanism for facilitating conference communications between two-way radio users and telephone users.

In addition, in some scenarios, it may also be critical for various officials to be joined together within a data collaboration session during the conference call with the police and/or firemen. For example, officials may need to jointly view overhead maps and other diagrams, such as building blueprints showing exits and stairways, while simultaneously communicating with the police and/or firemen. However, again, there is currently no system that provides data collaboration during a conference call involving telephones and two-way radio devices.

Furthermore, during an emergency situation, it may be necessary for a particular user to barge-in to one or more conference calls and interrupt any other conversations taking place during the conference call(s) to deliver an important or emergency announcement. However, current conference systems do not allow an existing or new participant to one or more conference calls to interrupt those conference call(s), such that all conference participants can only hear the interrupting participant and no other participants.

Therefore, what is needed is a system that enables two-way radio devices and telephone devices to be joined together in a voice conference call and that further enables simultaneous data collaboration. In addition, what is needed is a conferencing system that provides for dynamic control of voice states of conference participants.

SUMMARY OF THE INVENTION

A conference server, as one embodiment of the present invention, enables conferencing between two-way radio devices and various telephone devices. The conference server includes a first interface coupled to a radio network including one or more two-way radio devices and a second interface coupled to a telephone network including one or more telephone devices. A conference room within the conference server manages a conference call between the two-way radio devices and telephone devices by receiving voice streams originated by the two-way radio devices and telephone devices during the conference call via the respective interfaces and transmitting the received voice streams originated by two-way radio devices and telephone devices to remaining two-way radio devices and the telephone devices involved in the conference call via the respective interfaces. The conference server further includes processing circuitry for creating the conference room for the conference call. The processing circuitry is communicatively coupled to the conference room, the first interface and the second interface to transmit, receive and process the voice streams managed by the conference room during the conference call.

In an exemplary embodiment, the first interface is coupled to the radio network via a radio adapter configured to convert the voice streams between one format associated with the radio network and another format associated with the conference server. In a further embodiment, the second interface provides an interface to one or more circuit-switched networks and one or more packet-switched networks containing one or more of a PSTN telephone, a cellular telephone, an IP telephone, a computer and a personal digital assistant.

In another exemplary embodiment, a conferencing software module executable by the processing circuitry is used to create the conference room. In a further embodiment, the conferencing software module is further operable to create and manage multiple conference rooms in parallel. In still a further embodiment, the processing circuitry is further operable to process and transmit different types of media for each of the conference rooms. For example, the media types may include voice streams and data, such as text and multi-media that enables data and multimedia collaboration between voice participants associated with the telephone devices and provides one or more of instant messaging, presentation sharing, desktop sharing and video.

In yet another exemplary embodiment, the conference server further includes a conference policy maintaining parameters for creating the conference room, establishing the conference call and/or managing the conference room. For example, in one embodiment, the conference policy can include leg state information identifying a respective leg state (e.g., voice muted, voice un-muted, voice/data connection active or voice/data connection inactive/dropped) of each conference leg of the conference call, in which each conference leg is associated with one of the telephone devices or the two-way radio devices. In a further embodiment, the conference server also includes an application program interface (API) communicatively coupled to receive an instruction to create the conference room and setup conference legs as a result of the occurrence of various types of external events.

A communications system, as another embodiment of the present invention, provides conferencing services between a radio adapter coupled to a radio network including one or more two-way radio devices and one or more telephone devices within a telephone network via a conference server. The radio adapter operates to convert voice between a first format associated with the radio network and a second format associated with the second network. The conference server is communicatively coupled to the radio adapter and the telephone devices to create a conference room for managing a conference call between the two-way radio devices and telephone devices.

A method for conferencing two-way radio and telephone devices is a further embodiment of the present invention. The method includes receiving an instruction to establish a conference call between two-way radio and telephone participants, creating a conference room for the conference call, establishing a connection between the conference room and one or more telephone devices within a telephone network and establishing a connection between the conference room and a radio adapter communicatively coupled to a radio network containing one or more two-way radio devices. The method further includes transmitting voice streams between the telephone devices and two-way radio devices via the conference room and the radio adapter.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
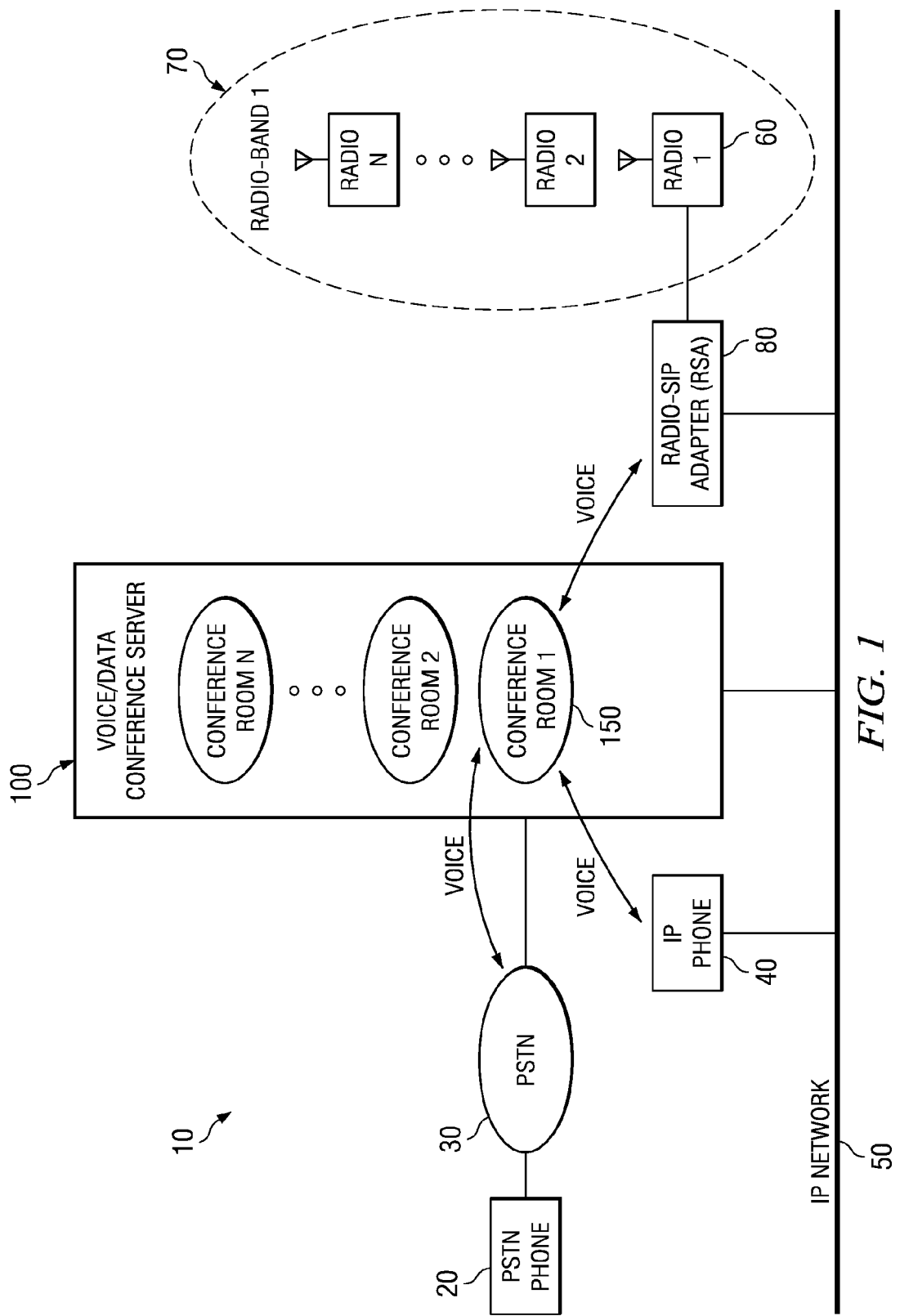
FIG. 1 illustrates an exemplary communications system providing conferencing between two-way radio devices and telephone devices in accordance with embodiments of the present invention.

FIG. 1 illustrates an exemplary communications system 10 providing conferencing between two-way radio devices and telephone devices, in accordance with embodiments of the present invention. The communications system 10 includes a voice/data conference server 100 providing one or more conference rooms 150 for conference calls. Each conference room 150 is associated with a particular conference call, and is responsible for establishing the different conference legs for the conference call and managing the leg states of the conference legs. For example, the conference room 150 can establish a respective conference leg for each voice and data connection to the conference call, add additional voice and/or data conference legs to the conference call, drop one or more voice and/or data conference legs and mute or un-mute one or more of the voice conference legs.

As shown in FIG. 1, multiple conference rooms 150 (Conf Room 1, Conf Room 2 . . . Conf Room N) can exist in parallel. However, voice between conference rooms 150 is not mixed, so that participants in one conference room 150 do not unintentionally hear participants in another conference room 150.

In one embodiment, the conference server 100 creates and manages the conference rooms 150 in specialized conferencing hardware or circuitry. In another embodiment, the conference server 100 creates and manages and conference rooms 150 using a combination of specialized conferencing hardware or circuitry, software and/or firmware. In yet another embodiment, the conference server 100 executes software routines on a standard, general-purpose personal computer (PC) to create and manage the conference rooms 150. In this embodiment, the conference server 100 is designed to enable additional separate general-purpose PCs to be stacked together for increased system scalability and redundancy. As such, no special hardware or circuitry, such as DSP chips and boards and high speed audio busses, is required, thereby minimizing manufacturing costs of the conference server 100.

The conference server 100 is coupled to an Internet Protocol (IP) or other packet-switched data network 50. For example, the data network 50 can be a local area network (LAN), wide area network (WAN), privately managed IP data network, an Internet-based virtual private network (VPN) that uses well-established secure data encryption and authentication methods, such as IPSEC, or a public Internet-based IP data network.

In an exemplary embodiment, the conference server 100 communicates over the data network 50 using an application-level text-based protocol, such as the Session Initiation Protocol (SIP), as described in J. Rosenberg, et al., "SIP: Session Initiation Protocol" RFC: 3261, June 2002, which is hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the G.711 and G.729 standards (audio CODECs), and other or additional standards or protocols. As will be appreciated, other or additional protocols and configurations may be used.

The communications system 10 further includes multiple communications devices that are capable of joining conference calls. In accordance with embodiments of the present invention, the communications devices include both traditional telephone devices, such as plain old telephone sets (POTS), cellular telephones, PBX phone sets, VoIP and SIP phones, and two-way radio devices. For example, as shown in FIG. 1, an IP phone 40 is communicatively coupled to the conference server 100 via the IP network 50, a Public Switched Telephone Network (PSTN) phone 20 is communicatively coupled to the conference server 100 via the PSTN 30 and a plurality of two-way radio devices 60 within a radio network 70 are communicatively coupled to the conference server 100 via one or more Radio-SIP Adapters (RSAs) 80. It should be understood that the PSTN 30 shown in FIG. 1 represents any circuit-switched network, such as the Public Switched Telephone Network (PSTN), Public Land Mobile Network (PLMN), and/or any other type or combination of circuit-switched networks.

The two-way radio devices 60 within the radio network 70 communicate with each other over a radio band (Radio-band1) having a particular frequency, type of channel and modulation format. Thus, each two-way radio device 60 within the radio network 70 that is tuned to Radio-band1 is able to speak and listen to other two-way radio devices 60 within the radio network 70 that also are tuned to Radio-band1. In a typical scenario, a user depresses a push-to-talk button on their two-way radio device 60 to speak to one or more other two-way radio users in the radio network 70.

For example, if there are two users within the radio network 70 whose two-way radio devices 60 are tuned to Radio-band1, when the first user depresses the push-to-talk button associated with Radio-band1, the first user is able to speak directly to the second user without requiring the usual call setup procedures, such as dialing, ringing and answering. As another example, assuming there are three or more users forming a user group within the radio network 70 whose two-way radio devices 60 are tuned to Radio-band1, when one of the users in the group depresses the push-to-talk button, that user is able to speak directly to all of the other users in that group. Thus, in the group scenario, all members of the group are able to simultaneously hear one user.

However, two radio users are not able to simultaneously depress their individual push-to-talk buttons. As a result, in a radio network 70, only one user can be heard at a time. A second user must wait for a first user to finish speaking and release their push-to-talk button before the second user can commence speaking. Thus, the second user and all other users in the group are typically locked out and cannot barge-in while the first user is speaking.

To connect the two-way radio devices 60 to a conference call involving one or more traditional telephone devices 20 and 40, one of the two-way radio devices 60 is connected to an RSA 80. The RSA 80 operates to convert voice and/or data between the format associated with the radio network 70 (e.g., Radio-band1) and the format associated with the IP data network 50 (e.g., SIP and VoIP). For example, in embodiments in which the voice/data conference server 100 is SIP-based, the RSA 80 can transmit SIP messages to the voice/data conference server 100 to initiate a conference call and/or join an existing conference call.

In an exemplary operation, a conference participant initiates a conference call by providing an instruction 60 to the conference server 40 that causes the conference server 40 to create a conference room 150 for the conference call. In one embodiment, the conference participant generates the instruction by operating a console that can invite multiple RSAs 80, PSTN telephones 20 and IP telephones 40 to the conference. In this embodiment, the RSAs may automatically answer, or alternately, one of the radio users may be required to accept the invite, for example, by depressing one or more dual tone multi-frequency (DTMF) keys on their two-way radio 60. Only one radio user need to accept for all radio users in the group.

In another embodiment, a radio user depresses a DTMF key or special sequence of keys on a two-way radio device 60 to generate an invitation to the conference server 100. In this embodiment, upon receipt of the invitation, the conference server 100 may automatically answer and then dial-out to invite a predetermined list of other users (telephone and/or radio) to the conference. For example, a radio user can depress a single key and automatically initiate a "Code-Red" conference with a group of other radio users, PSTN users and IP phone users.

In yet another embodiment, the conference participant generates the instruction to the conference server 100 by using a PSTN phone 20 or IP phone 40 to dial-in to the conference server 100. Thereafter, the conference participant can either enter an access code and/or PIN or interact with an IVR to individually invite each RSA 80, PSTN phone 20 and/or IP phone 40 or to invite a pre-designated list of RSAs 80, PSTN phones 20 and/or IP phones 40 to a specific conference. In still another embodiment, the conference participant provides the instruction to the conference server 100 via a graphical user interface (GUI) that provides a conference application program interface (API) to the conference server 100. For example, the conference API can be accessed via a laptop computer, a personal computer, a cell phone, a personal digital assistant (PDA) or other similar data device.

Once the conference server 100 receives the instruction from a conference participant to initiate a conference call, the conference server creates a conference room 150 for the conference call. The conference room 150 operates to establish and manage the conference call. Thus, the conference room 150 generates messages to invite conference participants (e.g., PSTN phone 20, IP phone 40 and RSA 80) to join the conference call, authenticates conference participants wanting to join the conference call (e.g., with a conference room identifier and/or a participant identifier), establishes a separate conference leg for each voice and data connection to the conference call, mixes incoming voice received from the conference participants and transmits the mixed voice back out to the conference participants via unicast data packets, provides various data conferencing services to the conference participants during the conference call, such as instant messaging, presentation sharing, desktop sharing and video, and implements various policies for managing the conference legs of the conference call (e.g., muting or un-muting one or more participants, adding and/or dropping one or more participants). The conference room 150 is further operable to release one or more participants from the conference call either upon request from the participant (e.g., hang-up or via GUI) or based upon a policy associated with the conference call (e.g., based on a pre-determined time of release, occurrence of an event or action of another participant).

In an exemplary operation of the conference room 150, if during the conference call, the conference room 150 simultaneously receives voice from the PSTN phone 20 and the RSA 80, the conference room 150 mixes the voice and transmits the mixed voice back out to the IP phone 40. To avoid echoes, the conference room 150 transmits only the voice from the RSA 80 to the PSTN phone 20 and transmits only the voice from the PSTN phone 20 to the RSA 80. As explained above, two or more radio participants are not able to simultaneously depress their individual push-to-talk buttons on their two-way radio devices 60. Therefore, the RSA 80 only transmits voice to the conference room 150 from one radio participant at a time. However, for voice received from the conference room 150, the RSA 80 is able to transmit the received voice over Radio-band1 via the attached two-way radio device 60 to multiple two-way radio devices 60 listening within the same band (Radio-band1) regardless of whether another radio participant is speaking.

Figure 2:
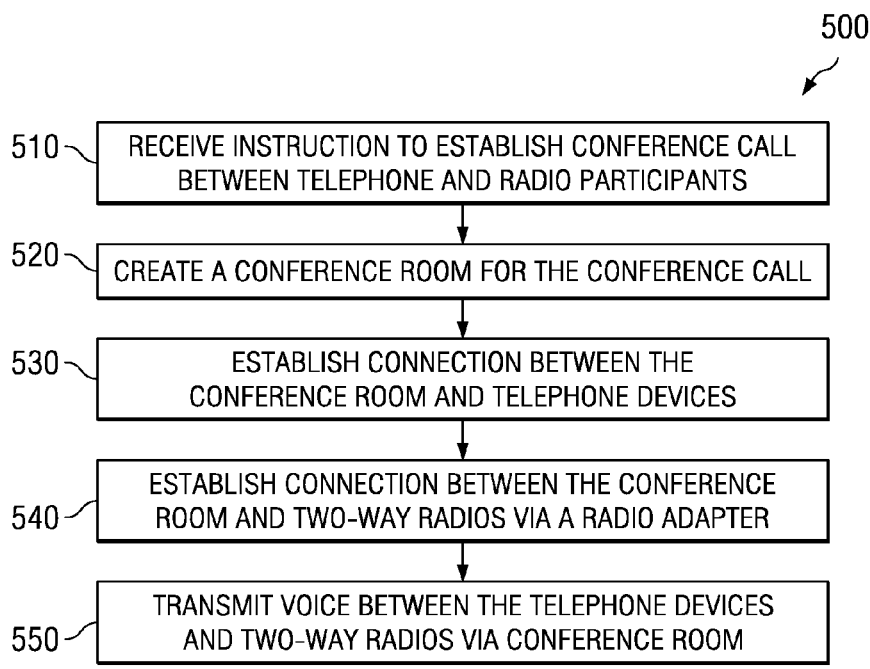
FIG. 2 is a flowchart illustrating an exemplary process for conferencing two-way radio and telephone devices in accordance with embodiments of the present invention.

FIG. 2 is a flowchart illustrating an exemplary process 500 for conferencing two-way radio and telephone devices in accordance with embodiments of the present invention. The process begins at step 510, where an instruction is received to establish a conference call between telephone and two-way radio participants. At step 520, a conference room for the conference call is created. At step 530, separate connections (i.e., conference legs) between the conference room and one or more telephone devices associated with the telephone participants are established, and at step 540, a single connection (i.e., conference leg) is established between the conference room and a radio adapter coupled to one or more two-way radio devices associated with the two-way radio users. Thereafter, at step 550, voice is transmitted between the telephone devices and the two-way radio devices via the conference room and the radio adapter.

Figure 3:
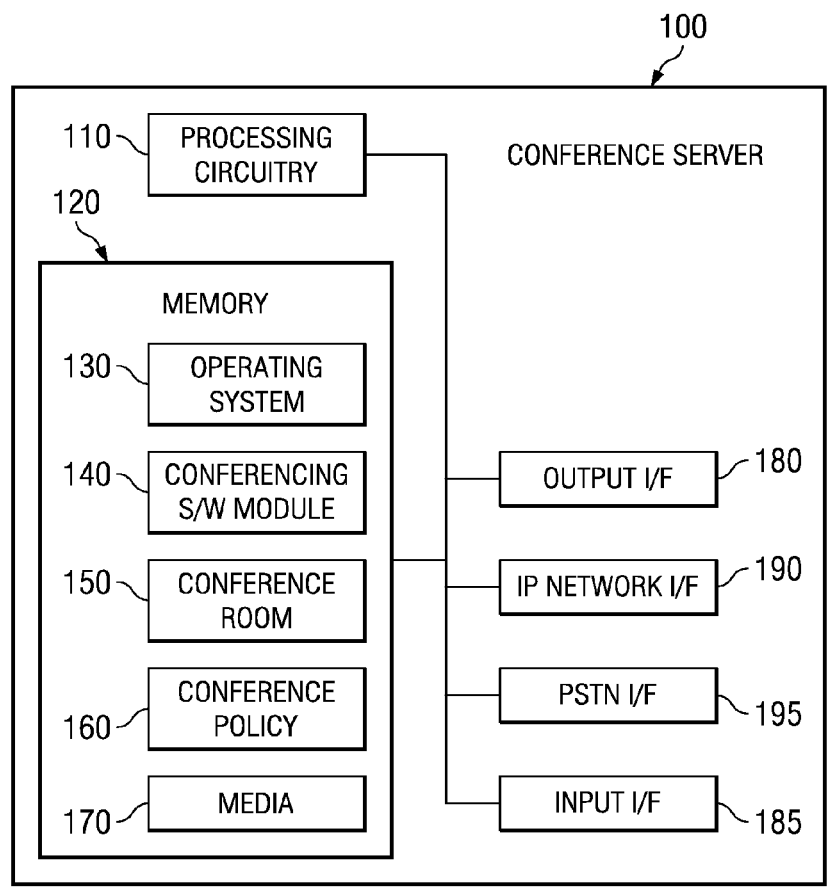
FIG. 3 illustrates an exemplary conference server in accordance with embodiments of the present invention.

Referring now to FIG. 3, a more detailed operation of the conference server 40 will now be described. The conference server 100 includes processing circuitry 110, a memory 120 and various interfaces 180, 185, 190 and 195. For example, to check the status of the conference server (e.g., troubleshoot problems, receive status reports, etc.), the interfaces can include an input interface 185 coupled to receive operator input from an input device, such as a keyboard, mouse, IP network or other similar input device and an output interface 180 coupled to provide status information to an output device, such as a display, speakers, printer, IP network or other output device. In addition, the interfaces can include an IP network interface 190 connected to transmit and receive voice and/or data to and from IP conference devices (e.g., the IP phone and RSA of FIG. 1) and a PSTN interface 195 to transmit and receive voice and/or data to and from PSTN conference devices (e.g, the PSTN phone of FIG. 1). In an exemplary embodiment, the PSTN interface 195 includes a conversion device internal or external to the conference server 100 for converting media between a circuit-switched format associated with the PSTN network and a packet-switched format associated with the conference server 100.

The memory 120 includes an operating system 130 and a conferencing software module 140. The processing circuitry 100 includes one or more processors that are capable of executing the operating system 130 and the conferencing software module 140. As used herein, the term "processor" is generally understood to be a device that drives a general-purpose computer, such as a PC. It is noted, however, that other processing devices, such as microcontrollers, Field Programmable Gate Arrays (FPGAs), Application Specific Integrated Circuits (ASICs), or a combination thereof, can be used as well to achieve the benefits and advantages described herein. The memory 120 includes any type of data storage device, including but not limited to, a hard drive, random access memory (RAM), read only memory (ROM), flash memory, compact disc, floppy disc, ZIP® drive, tape drive, database or other type of storage device or storage medium.

In a general operation of the conference server 100, the processing circuitry 110 accesses and runs the conferencing software module 140 to initiate and control a conference call between multiple participants. During execution of the conferencing software module 140, the processing circuitry 110 is operable to create a conference room 150 in the memory device 120 for the conference call and to connect the conference participants together in a conference call (i.e., establish the conference legs for the conference call) via the conference room 150. Once the conference room 150 is established, in an exemplary embodiment, the conference room 150 communicates with one or more external interfaces (e.g., an IP network interface 190 and a PSTN interface 195) to receive incoming media 170 (e.g., voice and/or data) from the conference participants, process the received media 170 using the processing circuitry 110 and transmit the processed media 170 (e.g., mixed voice and/or data) back out to the conference participants during the conference call.

In addition, the conference room 150 and/or processing circuitry 110 can access one or more predefined conference policies 160 to control and/or manage the conference call. Once accessed, the processing circuitry 110 performs routines dictated by the policies 160. For example, in an exemplary embodiment, the policy 160 may identify one or more conference participants to be included in the conference call. In another exemplary embodiment, the policy 160 may control muting or un-muting of one or more participants during the conference call.

Figure 4:
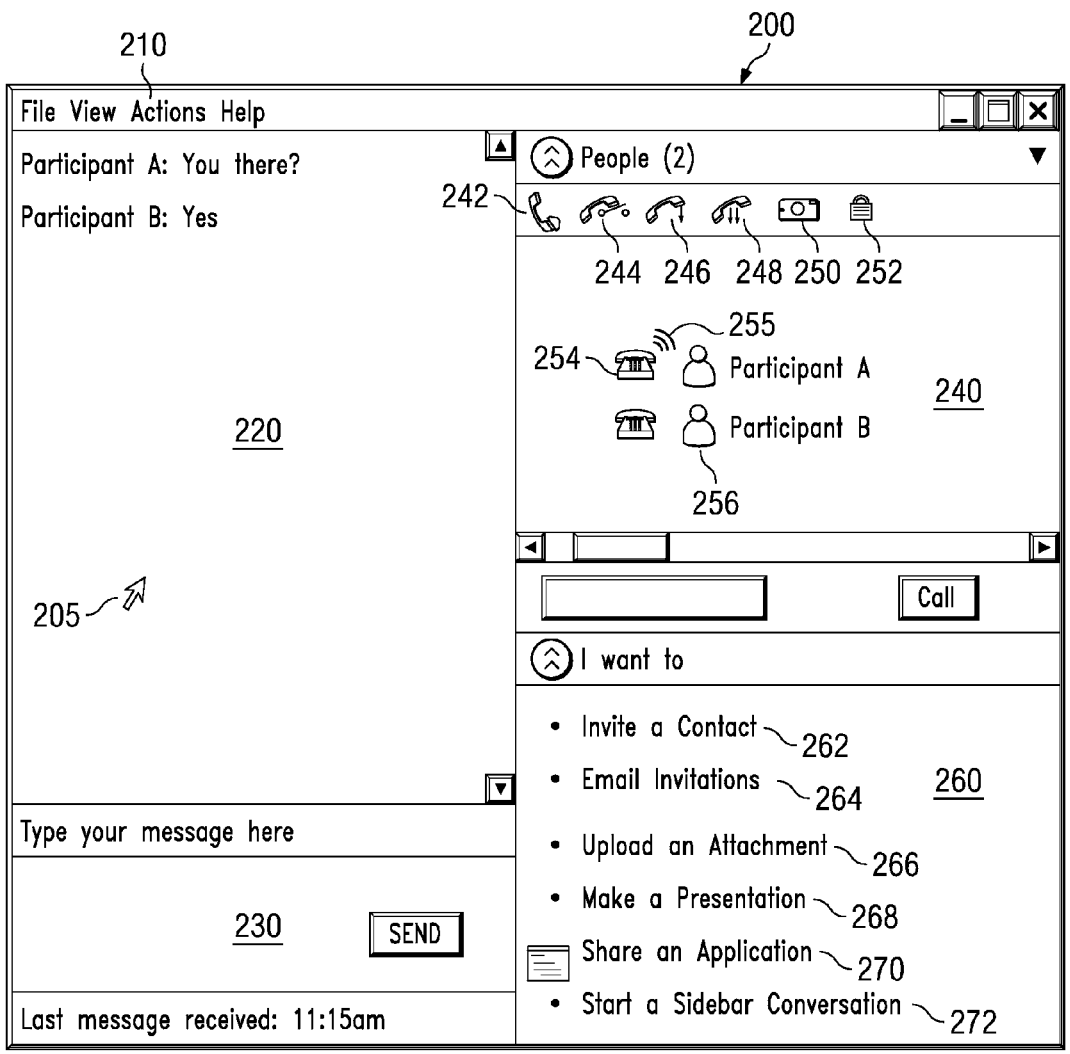
FIG. 4 illustrates an exemplary conference user interface for creating and managing a conference room in accordance with embodiments of the present invention.

As described above, the conference call can be initiated and/or managed via a user interface provided to one or more participants. FIG. 4 illustrates an exemplary conference graphical user interface (GUI) 210 that can be provided by the conference server 100 to a conference participant in accordance with embodiments of the present invention. The conference GUI 210 is displayed on a display device 200 (e.g., a laptop display, personal computer display, cell phone display, PDA display, etc.) connected to a communications device operated by a user. The GUI 210 enables the user to create and manage one or more conference rooms. For example, the user can add/drop conference participants to a conference room, send/receive data, such as text and multi-media for instant messaging, file sharing, presentation sharing, desktop sharing and video, via the conference room and create additional conference rooms by positioning a cursor 205 over a desired feature displayed on the GUI 210 and clicking on that desired feature.

The GUI 210 shown in FIG. 4 includes a conference instant message section 220, a conference text input section 230, a conference participant section 240 and a conference option section 260. To create a conference call, in one embodiment, the user can click on an "Invite a Contact" option 262 within the conference option section 260 to call one or more contacts from his/her contacts list and establish a voice connection with those contacts for the conference call and/or provide a screen pop to one or more contacts with a link (e.g., icon or other button) to create a data connection with those contacts for the conference call. In another embodiment, if the user has knowledge of the e-mail address of a particular participant, the user can send an e-mail to one or more participants with an invitation to the conference call and the dial-in number and/or link for the conference call by clicking on an "Email Invitations" option 264. In yet another embodiment, if the user has knowledge of the telephone number of a particular participant, the user can access the conference participant section 240 and enter their telephone number within the box next to the "Call" button and then click on the "Call" button to create a voice connection with that participant for the conference call. The user can also add additional participants to the conference call by either entering their telephone number in the box next to the "Call" button or inviting them via their contact and/or e-mail information, as described above.

Once a conference call has been established with one or more participants, each participant will be listed in the participant section 240. The status of each participant is also discernable by viewing the state of one or more icons next to the participant. For example, if the participant currently has a voice connection (i.e., the voice leg is currently connected to the conference call), the voice icon 254 will appear bright. However, if the participant does not have a voice connection (i.e., the voice leg is not currently connected to the conference call), the voice icon 254 will appear dark. Likewise, if the participant currently has a data connection (i.e., the data leg is currently connected to the conference call), the data icon 256 will appear bright. However, if the participant does not have a data connection (i.e., the data leg is not currently connected to the conference call), the data icon 256 will appear dark. In addition, if the participant is currently speaking, a speaking icon 255 will appear next to the voice icon 254 of that participant. This way, each participant, moderator and/or administrator having the GUI 210 is able to discern the identity of the person currently speaking.

In the conference participant section 240, the user is also able to perform a number of actions related to the conference call participants by clicking on one of the icons or boxes shown therein. For example, the user can select one or more participants within the list of conference participants shown in the participant section 240 (e.g., Participant A and/or Participant B) by clicking on the desired participants, and then the user can mute the selected participant(s) by clicking on icon 242, place the selected participant(s) on hold by clicking on icon 244 or drop the selected participant(s) by clicking on icon 246. If a participant has been dropped from the conference call (or disconnects himself from the conference call), that participant can be rejoined to the conference call by clicking on icon 254. In addition, the user can end the conference call by clicking on icon 248, record the conference call by clicking on icon 250 or lock the conference call to prevent new participants from joining by clicking on icon 252.

Recordings of the conference call might be made for archiving, training and other purposes. The recordings can also be played back via the GUI 210 or by depressing DTMF keys on telephone or two-way radio devices. Real-time recordings might also be used to buffer speech so that if two participants are talking at the same time, the conference server allows one speaker through, buffers or queues the second speaker, and then plays out the second speaker after the first speaker is done.

If multiple conference participants have data devices that are connected to the conference call, the user interface allows the user to transmit/receive data to/from other participants. For example, to send an instant message to a particular participant, the user can click on the text icon 256 next to the name of the participant to initiate an instant message session with that participant. The user can type text into the conference text input section 230 and click send to send the instant message to the selected participant. The message will be displayed within the conference instant message section 220. In addition, any instant messages sent from the selected participant to the user will also be displayed in the conference instant message section 220.

In another embodiment, the user is also able to upload an attachment to the conference call for the other conference participants to view by clicking on an "Upload an Attachment" option 266, make a presentation to the other participants (e.g., upload a Power Point™ presentation to the conference call) by clicking on a "Make a Presentation" option 268 and/or share an application (e.g., Microsoft Power Point™) with the other conference participants by clicking on a "Share an Application" option 270 within the conference options section 260. Furthermore, the user is able to initiate a sidebar conversation (a separate conference call) with one or more participants by clicking on "Start a Sidebar Conversation" option 272.

By using a GUI 210 to create and/or manage a conference call, the user is provided with the ability to easily and efficiently implement a multi-media conference call with any available conference participant. Other conference participants who have a data connection for the conference call can also be provided with the same GUI 219 with access to some or all of the features on the GUI 210. For example, the user initiating the conference call can restrict the ability of other participants to add/drop participants, mute/un-mute participants, lock the conference call and/or record the conference call.

Figure 5A:
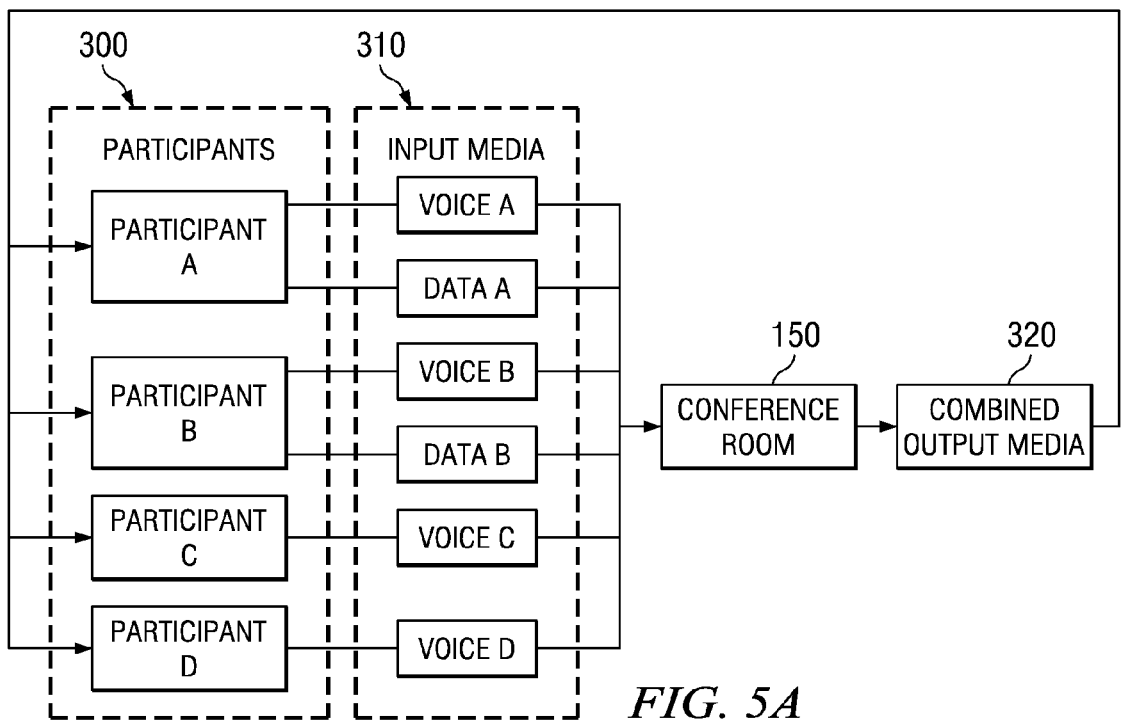
FIGS. 5A and 5B illustrate an exemplary operation of a conference room in accordance with embodiments of the present invention.
Figure 5B:
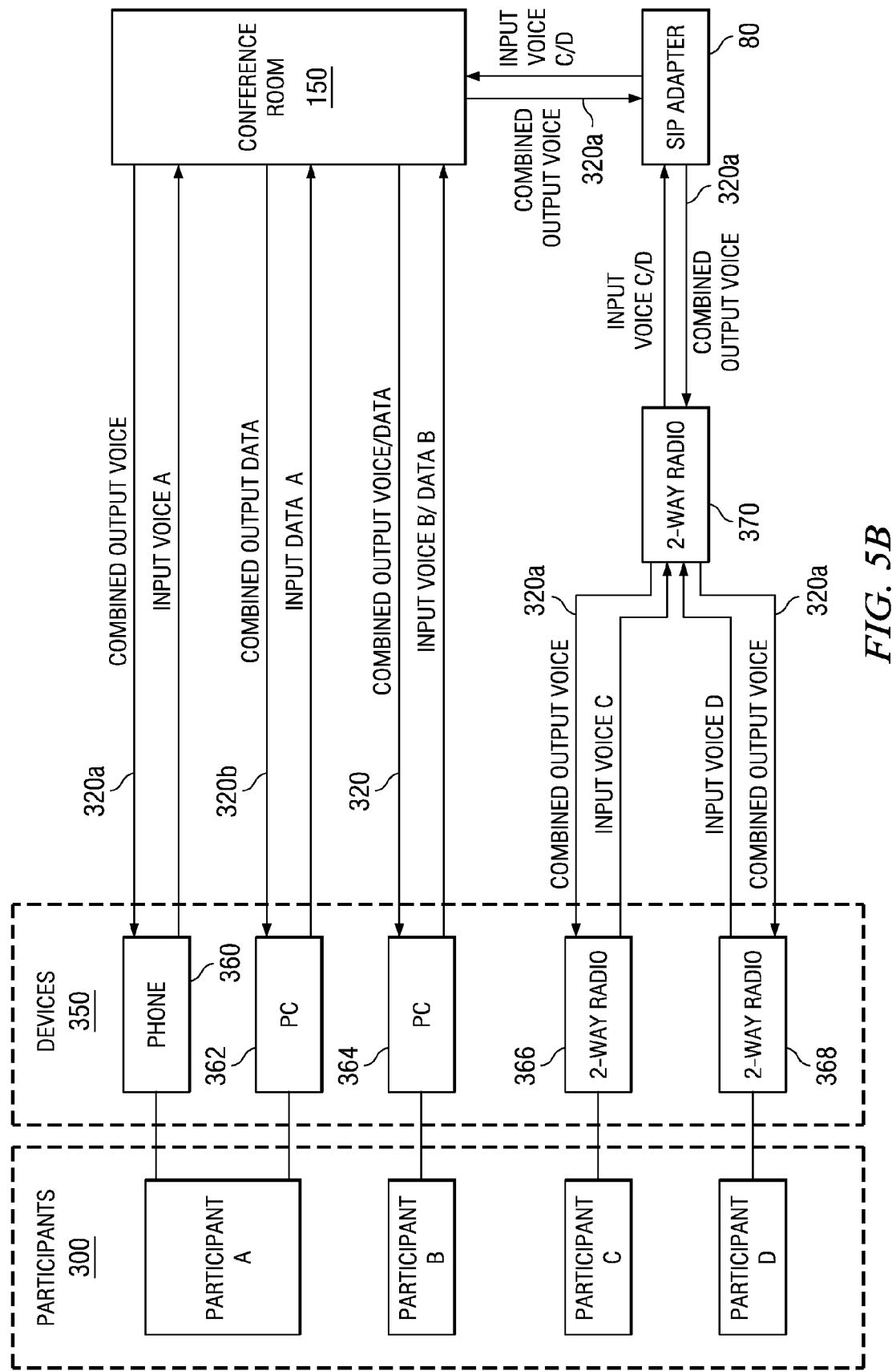

FIGS. 5A and 5B illustrate an exemplary operation of a conference room 150 in accordance with embodiments of the present invention. In FIG. 5A, multiple participants 300 (A, B, C and D) are engaged in a conference call via the conference room 150 and are couple to transmit input media 310 to the conference room 150 and receive output media 320 from the conference room 150. Participants A and B have both a voice connection (voice conference leg) and a data connection (data conference leg) to the conference room 150, while Participants C and D have only a voice connection (voice conference leg) to the conference room 150. Thus, Participant A is capable of transmitting both voice (Voice A) and data (Data A) to the conference room 150, Participant B is capable of transmitting both voice (Voice B) and data (Data B) to the conference room 150, Participant C is capable of transmitting voice (Voice C) to the conference room 150 and Participant D is capable of transmitting voice (Voice D) to the conference room 150.

As described above, the conference room operates to combine the input media received from all participants 300 and transmit the combined media 320 back out to the participants. For example, if during the conference call, the conference room 150 simultaneously receives voice from Participant A (Voice A) and Participant D (Voice D), the conference room 150 mixes the voice and transmits the mixed voice back out to Participants B and C. To avoid echoes, the conference room 150 transmits only the voice from Participant D to Participant A and transmits only the voice from Participant A to Participant D. Likewise, if the conference room 150 receives both voice (Voice A) and data (Data A) from Participant A, the conference room will transmit both the voice (Voice A) and data (Data A) to Participant B, while transmitting only the voice (Voice A) to Participants C and D.

To more clearly explain the operation of the conference room, reference is now made to FIG. 5B, where each participant 300 is associated with one or more communications devices 350. In FIG. 5B, Participant A is associated with a PSTN phone 360 and a personal computer 362, Participant B is associated with a personal computer 364 providing voice over IP services, Participant C is associated with a two-way radio device 366 and Participant D is associated with a two-way radio device 368. The two-way radio devices 366 and 368 are wirelessly coupled via a radio network, and are coupled to the conference room via the SIP adapter 80. Two-way radio device 366 has a physical connection to the SIP adapter 80, while two-way radio device 368 is wirelessly connected to the SIP adapter 80 via two-way radio device 366.

Each communications device 350 is capable of receiving voice and/or data from other communications devices 350 via the conference room 150. For example, Participant A speaks into the PSTN phone 360 to provide input voice (Voice A) to the conference room 150, Participant B speaks into a microphone coupled to the VoIP personal computer 364 to provide input voice (Voice B) to the conference room 150, Participant C depresses their push-to-talk button on their two-way radio device 366 to provide input voice (Voice C) to the conference room 150 via the SIP adapter 80 and Participant D depresses their push-to-talk button on their two-way radio device 368 to provide input voice (Voice D) to the conference room 150 via the SIP adapter 80. A dedicated two-way radio 370 is shown connected to the SIP adapter 80 to provide the input voice (Voice C and Voice D) from the other two-way radio devices 366 and 368 within the same radio band to the SIP adapter 80.

As mentioned before, only one of the two-way radio devices 366 or 368 is able to depress their push-to-talk button at a time. Therefore, the SIP adapter 80 transmits to the conference room 150 voice from only one of the two-way radio devices 366 or 368 at a time (i.e., Voice C or Voice D). It should be understood that during the conference call, the radio network operates as normal. For example, while Participant C is speaking into his/her two-way radio device, Participant D hears Participant C via the radio network, and vice-versa.

Upon receipt of voice from one or more participants, the conference room 150 mixes the received voice and provides the mixed or combined voice back out to the communications devices 350. For example, if the conference room 150 simultaneously receives voice from VoIP personal computer 364 and SIP adapter 80, the conference room 150 combines the voice and outputs the combined voice 320a to the PSTN phone 360. To avoid echoes, the conference room 150 transmits only Voice B to the SIP adapter 80 and transmits only Voice C or Voice D to the VoIP personal computer 364. Likewise, if the conference room 150 simultaneously receives voice from PSTN phone 360 and SIP adapter 80, the conference room 150 combines the voice and outputs the combined voice output 320a to the VoIP personal computer 364. Again, to avoid echoes, the conference room 150 transmits only Voice A to the SIP adapter 80 and transmits only Voice C or Voice D to the PSTN phone 360. As another example, if the conference room 150 simultaneously receives voice from PSTN phone 360 and VoIP personal computer 364, the conference room 150 combines the voice and outputs the combined voice 320a to the SIP adapter 80. Once again, to avoid echoes, the conference room 150 transmits only Voice B to the PSTN phone 360 and transmits only Voice A to the VoIP personal computer 364.

For data conferencing/collaboration, the conference room 150 is capable of receiving data (input Data A) from the personal computer 362 associated with Participant A and data (input Data B) from the VoIP personal computer 364 associated with Participant B. The input data may include text and multi-media that provides a number of different data conferencing services, such as instant messaging, presentation sharing, desktop sharing and video. Input data (Data B) received from the VoIP personal computer 364 is output by the conference room 150 to the personal computer 362 as output data 320b. In addition, input data (Data A) received from the personal computer 362 is output by the conference room to the VoIP personal computer 364 as output data 320b. In scenarios where the conference room 150 simultaneously receives voice and data from communications devices 350 other than the VoIP personal computer 364, the conference room 150 combines the received voice and data and transmits the combined voice and data 320 to the VoIP personal computer 364.

Figure 6:
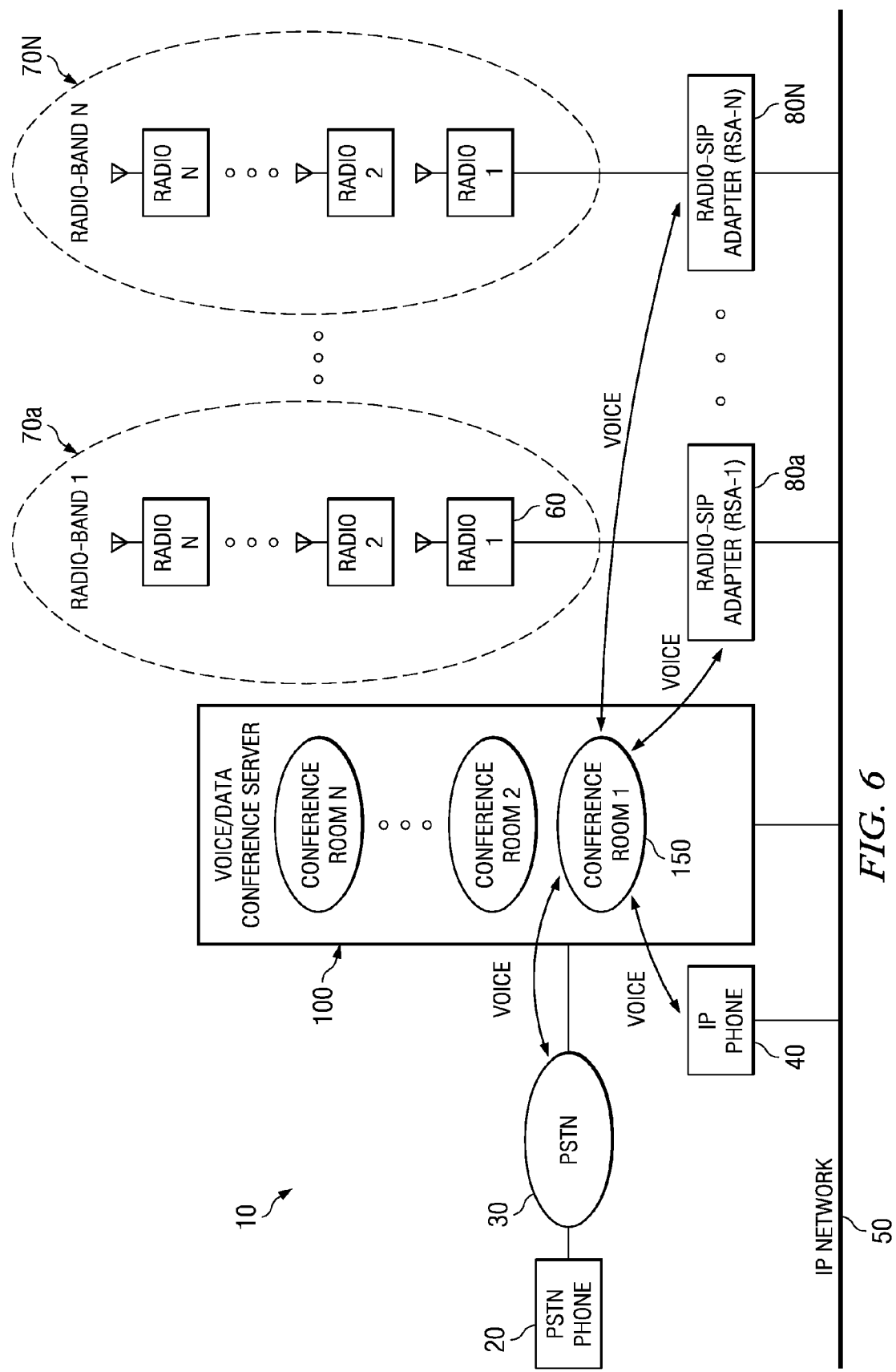
FIG. 6 illustrates an exemplary communications system providing conferencing with two-way radios within different radio networks in accordance with embodiments of the present invention.

Although the previous description has focused on conferencing between telephone devices and two-way radio devices within a single radio network, in other embodiments, conferencing involving multiple radio networks is possible. FIG. 6 illustrates an exemplary communications system 10 providing conferencing with two-way radios 60 within different radio networks 70a . . . 70N in accordance with embodiments of the present invention. In FIG. 6, a single conference server 100 and a single data network 50 can be shared between numerous radio users, PSTN phone users and IP phone users. Multiple and separate conference rooms 150 can exist so that, for example, the police (Radio-band1), fire (Radio-band2) and mayor's office (PSTN phones) in one city are in an entirely separate conference than the subway police (Radio-band3) and airport terminal police (Radio-band4) in another city. Each conference can occur simultaneously and be handled by separate conference rooms 150 within the same conference server 100.

For example, in FIG. 6, two-way radio devices 60 within a first radio network 70a (Radio-band1) are conferenced together with two-way radio devices 60 from one or more additional radio networks 70N (Radio-bandN) and one or more telephone devices (e.g., PSTN phone 20 and IP phone 40) via a conference room 150 within the conference server 100. In one embodiment, the different radio networks 70a . . . 70N cover the same geographic area, but they operate in different bands and potentially on different frequencies with different types of radio channels, modulation formats, etc. For example, one radio network 70a may be used by police, while another radio network 70N is used by firemen within the same geographic area. In another embodiment, the radio networks 70a . . . 70N cover different geographic areas and operate in the same band or in different bands. For example, one radio network 70a may operate in one area of the city, while another radio network 70N operates in another area of the city. As another example, one radio network 70a may operate in one city, while another radio network 70N operates in another city.

Each radio network 70a . . . 70N is coupled to an RSA 80a . . . 80N. In one embodiment, there is a single RSA 80a coupled of all of the radio bands (radio networks) within a single city or in multiple cities. In another embodiment, there are multiple RSAs 80a . . . 80N that are each coupled to one or more radio networks 70a . . . 70N. As shown in FIG. 6, each radio network 70a . . . 70N has a respective RSA (RSA-1 . . . RSA-N) coupled thereto. In this embodiment, the RSA's 80a . . . 80N may also be geographically separated, such as at different locations within a single city or at different locations in multiple cities. Providing a separate RSA 80a . . . 80N for each radio network 70a . . . 70N allows intra-city and/or inter-city radio conferences between two-way radio devices tuned to different radio bands (e.g., fire, police and transportation within a single city or fire, police and transportation within multiple cities).

Figure 7:
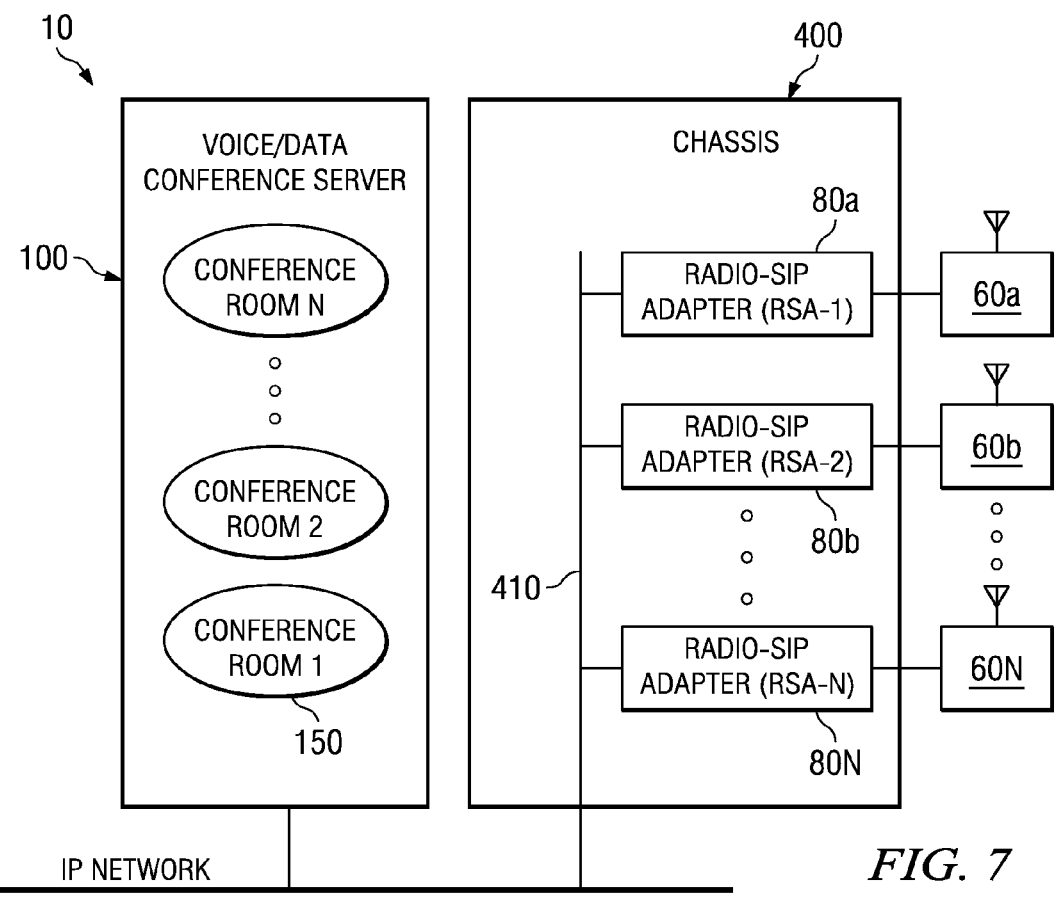
FIG. 7 illustrates an exemplary configuration of multiple radio-SIP adapters in accordance with embodiments of the present invention.

Alternatively, the RSA's 80a, 80b . . . 80N can be combined within a single hardware chassis 400, as shown in FIG. 7, for increased system density. In FIG. 7, the connection between RSAs is a local area network (LAN) 410. The conference server 100 can be connected to the LAN 410 via the data network 50, as shown, or integrated within the same chassis 400.

Figure 8:
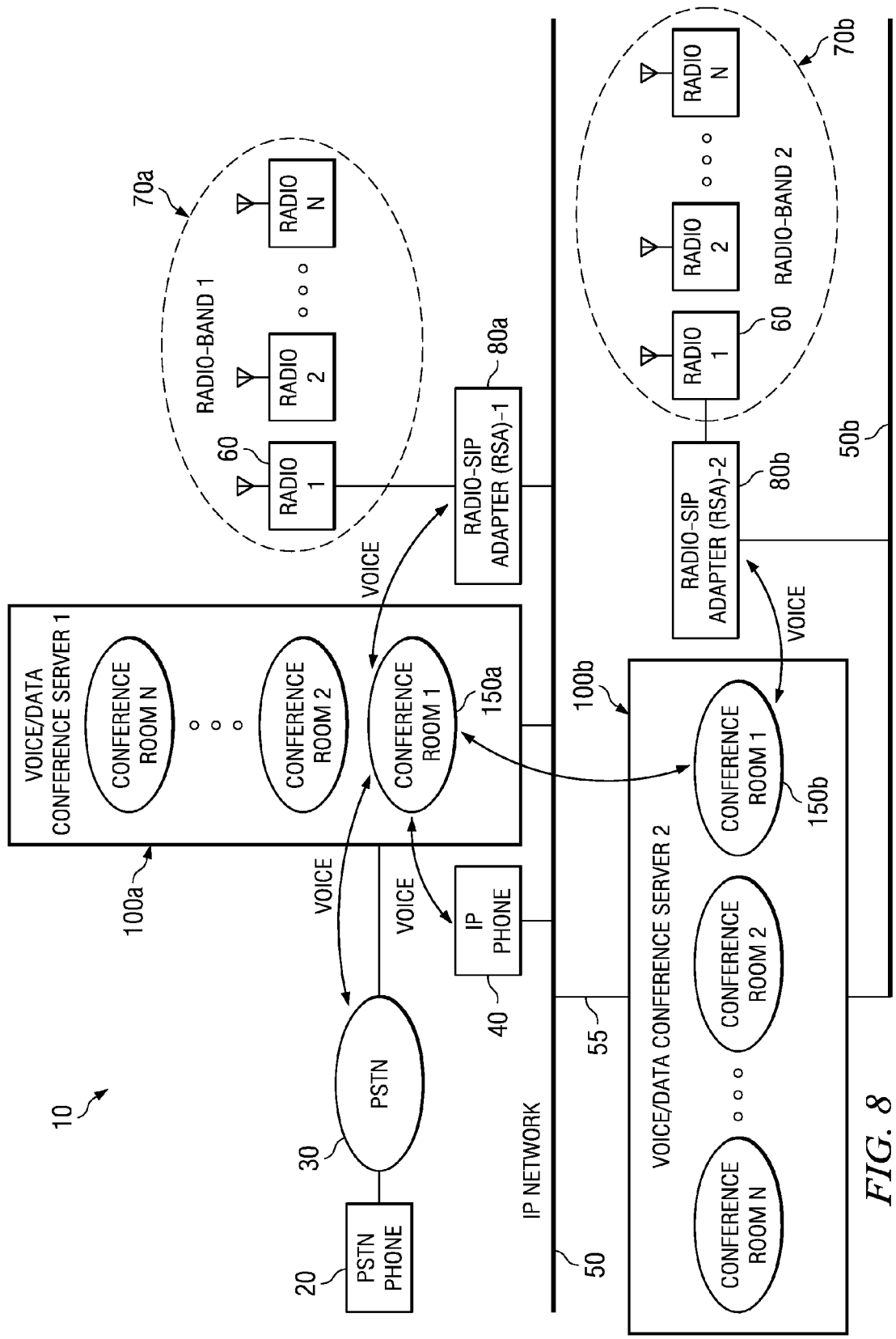
FIG. 8 illustrates another exemplary communications system providing conferencing with two-way radios within different radio networks using multiple conference servers in accordance with embodiments of the present invention.

FIG. 8 illustrates another exemplary communications system 10 providing conferencing with two-way radios 60 within different radio band networks 70a . . . 70N in accordance with embodiments of the present invention. In FIG. 8, multiple conference servers 100a and 100b and multiple data networks 50a and 50b are used to connect numerous radio users, PSTN phone users and IP phone users. For example, each city can have its own data network 50a, 50b and conference server 100a, 100b that supports only intra-city communication requirements.

In an exemplary embodiment, the separate conference servers 100a and 100b can be joined together via connector legs 55 (e.g., additional data networks) between the conference servers 100a and 100b so that a specific conference room 150a in one conference server 100a can be joined to a specific conference room 150b in another conference server 100b to facilitate a single conference call. For example, as shown in FIG. 8, PSTN phone 20, IP phone 40 and two-way radio devices within Radio-band1 70a are connected in a conference call via conference room 150a and RSA-1 80a. To join another group of two-way radio devices in a different city (Radio-band2) to the same conference call, a connection is established between RSA-2 80b and conference room 150b and another connection is established between conference room 150b and conference room 150a.

Figure 9:
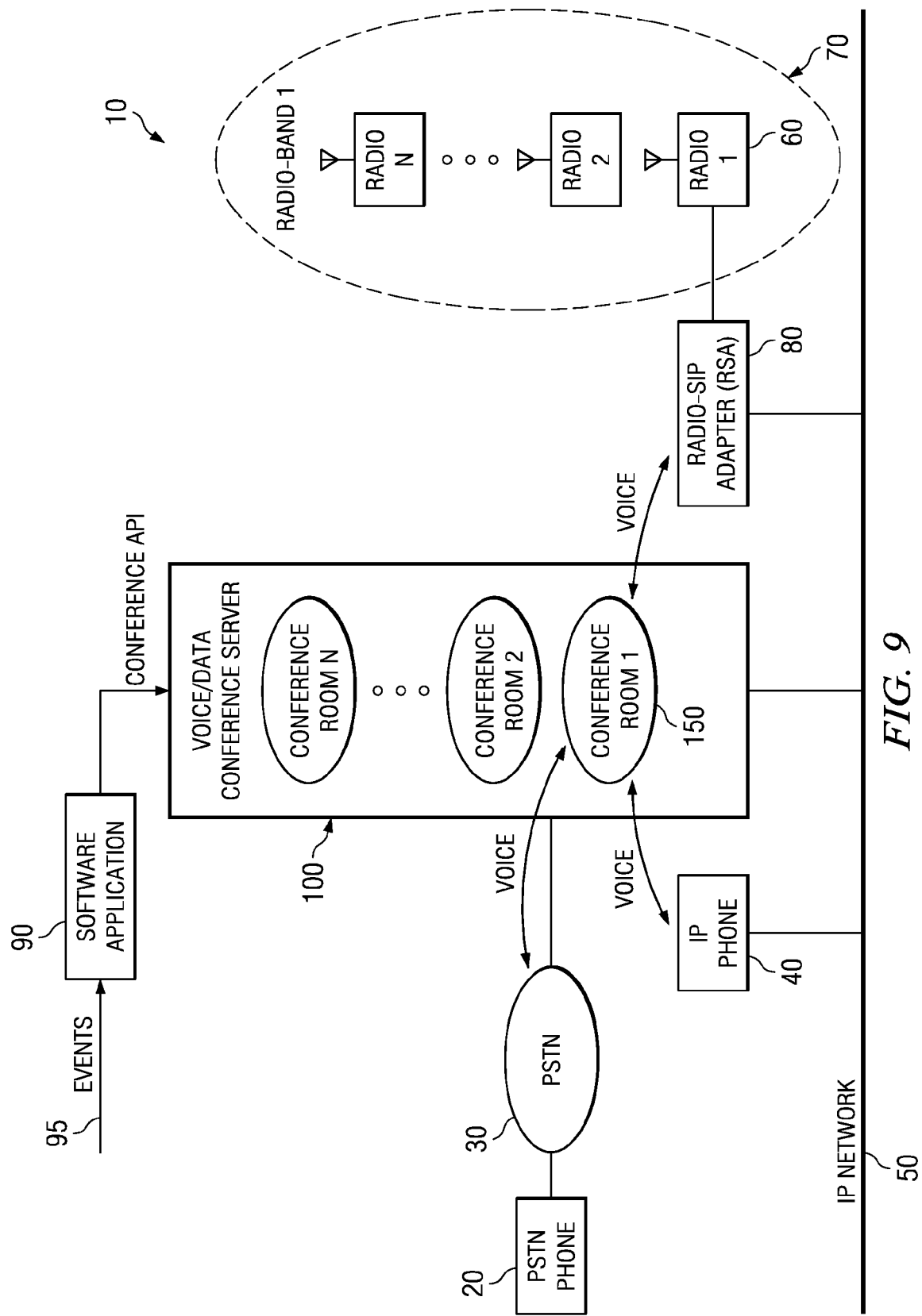
FIG. 9 illustrates an exemplary communications system providing automated conferencing based on an external event in accordance with embodiments of the present invention.

FIG. 9 illustrates an exemplary communications system 10 providing automated conferencing based on an external event in accordance with embodiments of the present invention. As can be seen in FIG. 9, a conference can be automatically initiated when an external event or alarm 95 occurs. An external software application 90 uses an application program interface (API) to the conference server 100 to create a conference room 150 and invite the appropriate list of participants. The participant list can be provided by the software application 90 or stored within the conference server (e.g., as a policy 160 shown in FIG. 2).

For example, a particular alarm 95 received by the software application 90 can cause the software application 90 to access the conference server 100 via the API, create a conference room for a conference call and cause the conference room to send invites to PSTN phone 20, IP phone 40 and RSA 80. Upon answering and/or receiving an interrupt (e.g., a beep or tone), each participant can receive an automated message indicating that the alarm has occurred and they are now being conferenced. In other embodiments, the conference server 100 may also dial-out to participants by name so that these participants receive screen pops in order to perform data collaboration with other conference participants.

Figure 10:
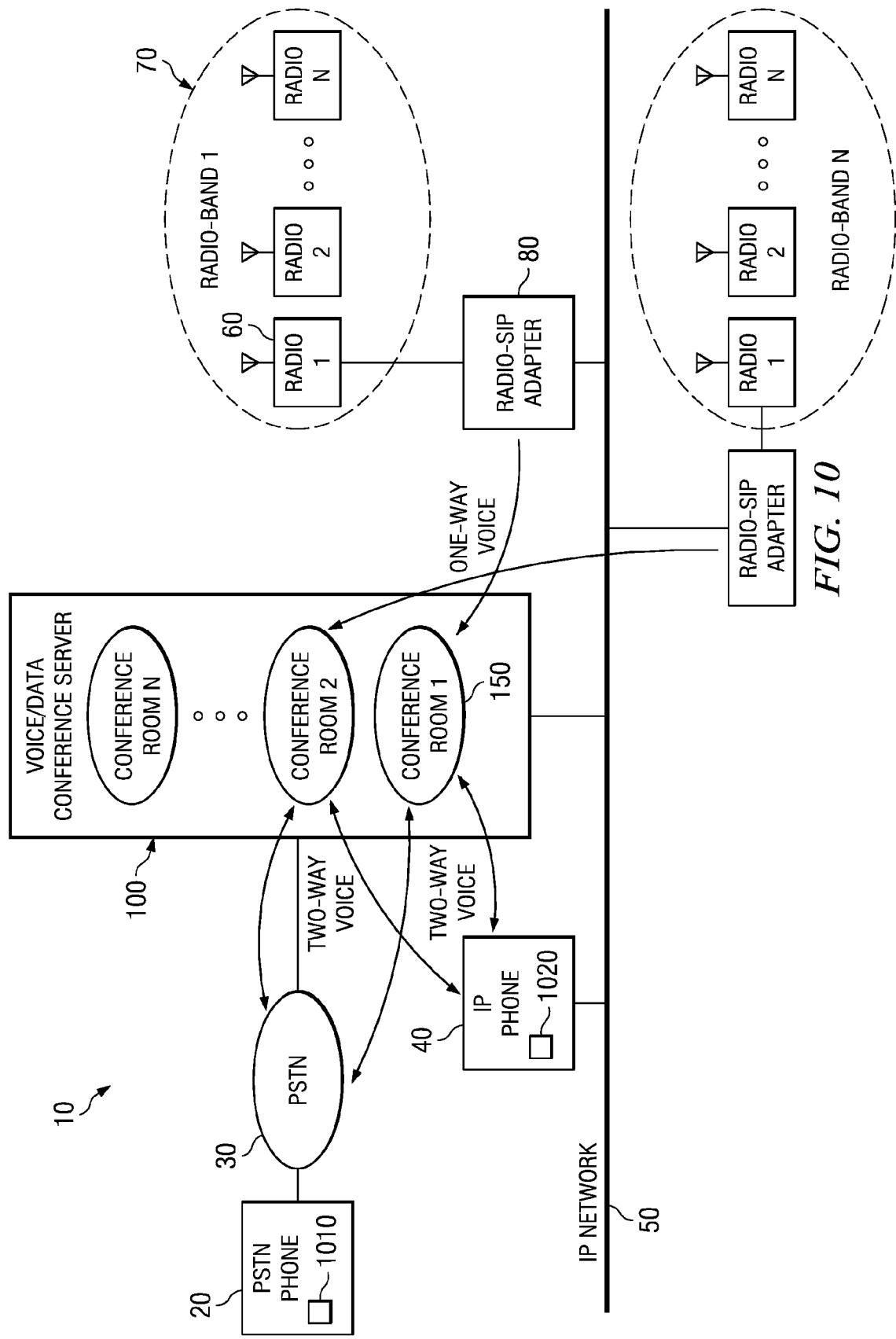
FIG. 10 illustrates an exemplary communications system providing controllable conference participant voice mixing states in accordance with embodiments of the present invention.

FIG. 10 illustrates an exemplary communications system providing controllable conference participant voice states in accordance with embodiments of the present invention. As discussed above, the conference server 100 can maintain one or more conference policies for creating and/or managing one or more conference calls. An example of such a conference policy is a policy for controlling the audible (volume) level of one or more conference participants. A specific case of this audible policy involves the muting and un-muting of different conference participants.

In FIG. 10, the PSTN phone 20, IP phone 40 and two-way radio devices 60 within Radio-band1 are involved in a first conference call via conference room 1, while the PSTN phone 20, IP phone 40 and two-way radio devices 60 within Radio-bandN are involved in a second conference call via conference room 2. The PSTN phone 20 and IP phone 40 are two-way voice participants in both conference calls. That is, the participant on the PSTN phone 20 and the participant on the IP phone 40 are both able to simultaneously listen and speak in both conference calls. However, the two-way radio devices 60 within both radio networks (Radio-band1 and Radio-bandN) are only one-way voice participants, in that the two-way radio device participants in Radio-band1 are able to speak to each other and to the conference participants (i.e., PSTN phone 20 and IP phone 40), but not hear the other conference participants, and the two-way radio device participants in Radio-bandN are able to speak to each other and to the conference participants (i.e., PSTN phone 20 and IP phone 40), but not hear the other conference participants. For example, assuming the PSTN phone 20 is associated with the mayor's office, the IP phone 40 is associated with homeland security officials, Radio-band1 is associated with the fire department and Radio-band N is associated with the police department, in FIG. 10, the mayor's office and homeland security officials are able to listen in to two separate fire and police radio conferences, while also listening and speaking to each other in both conferences.

In an exemplary embodiment, muting and un-muting of participants is achieved using a respective Generalized Pushto-Talk (GPTT) button 1010 associated with each of the telephone devices involved in the conference call. In one embodiment, the GPTT button 1010 (e.g., a special button or key or sequence of one or more DTMF keys that are depressed and released) is on the telephone device itself. For example, if the PSTN phone participant desires to have his/her speech muted at the conference rooms 150 so that other participants involved in the conference calls are no longer able to hear his/her voice, the PSTN phone participant can depress a GPTT button 1010 on the PSTN phone 20 that causes the PSTN phone 20 to send a message to the conference server 100 to mute the audio of the PSTN participant at the input of the conference rooms.

In another embodiment, the GPTT button 1010 is located on a personal computer (not shown) having a data conferencing connection to the conference room. For example, if the IP phone participant has a PC connected to one of the conference rooms (e.g., conference room 1), and the IP phone participant's speech is currently muted at conference room 1, to un-mute the IP phone participant, the IP phone participant can depress a mouse button on a graphical icon or symbol displayed on the PC display to send a message from the PC to the conference server 100 thereby instructing the conference server 100 to un-mute the audio entering conference room 1 from the IP phone 40 and also to un-mute the audio exiting conference room 1 destined for the other participants.

The conference participants can further control muting/un-muting as to specific other participants. For example, to un-mute audio from the IP phone participant to only the PSTN phone 20 and not to the two-way radio devices 60 within Radio-band1, the IP phone participant can depress (or double-click) the mouse button on an icon, a name, a nickname, a symbol or some other graphical representation that corresponds to the PSTN phone participant to cause the PC to send a message to the conference server 100 to un-mute the audio entering conference room 1 from the IP phone 40 and to un-mute the audio exiting conference room 1 destined for the PSTN phone 20. Participants having PC's or other data devices may also get a visual indication that one or more participants are depressing their GPTT buttons.

In other embodiments, the GPTT button concept can be extended to control not only muting and un-muting, but also the voice mixing state of a conference room. The voice mixing state of a conference room is defined herein as a specific combination of audio to be received and sent to each conference participant. For example, the audio mixing state might cause one or more participants to be excluded from or included in the conference or certain participants to be able to speak to and/or listen to only certain other participants.

In an exemplary embodiment, the voice mixing state of a conference call is controlled using a respective Generalized Push-to-Conference (GPTC) button 1020 associated with each of the telephone devices involved in the conference call. Each participant might have multiple different GPTC buttons 1020 that cause different changes in voice mixing states. As an example, assume that the PSTN phone 20 and two-way radio devices 60 within Radio-band1 are involved in the conference call being managed by conference room 1 before the IP phone 40 joins the call. When the IP phone 40 joins the conference call, the IP phone participant can depress the GPTC button 1020 on the IP phone or nearby PC to cause the IP phone participant's voice to override and interrupt the conference to deliver an important or emergency announcement. During this time, only the IP phone participant's voice is heard by the PSTN phone participant and two-way radio device participants. As another example, assume all participants (PSTN phone 20, IP phone 40 and two-way radio devices 60) initially are able to listen and speak to each other via conference room 1. Then, the PSTN phone participant depresses a GPTC button (not shown), and subsequently only the PSTN phone participant plus the IP phone participant are able to speak (i.e., the two-way phone participants speech is muted at conference room 1).

Figure 11:
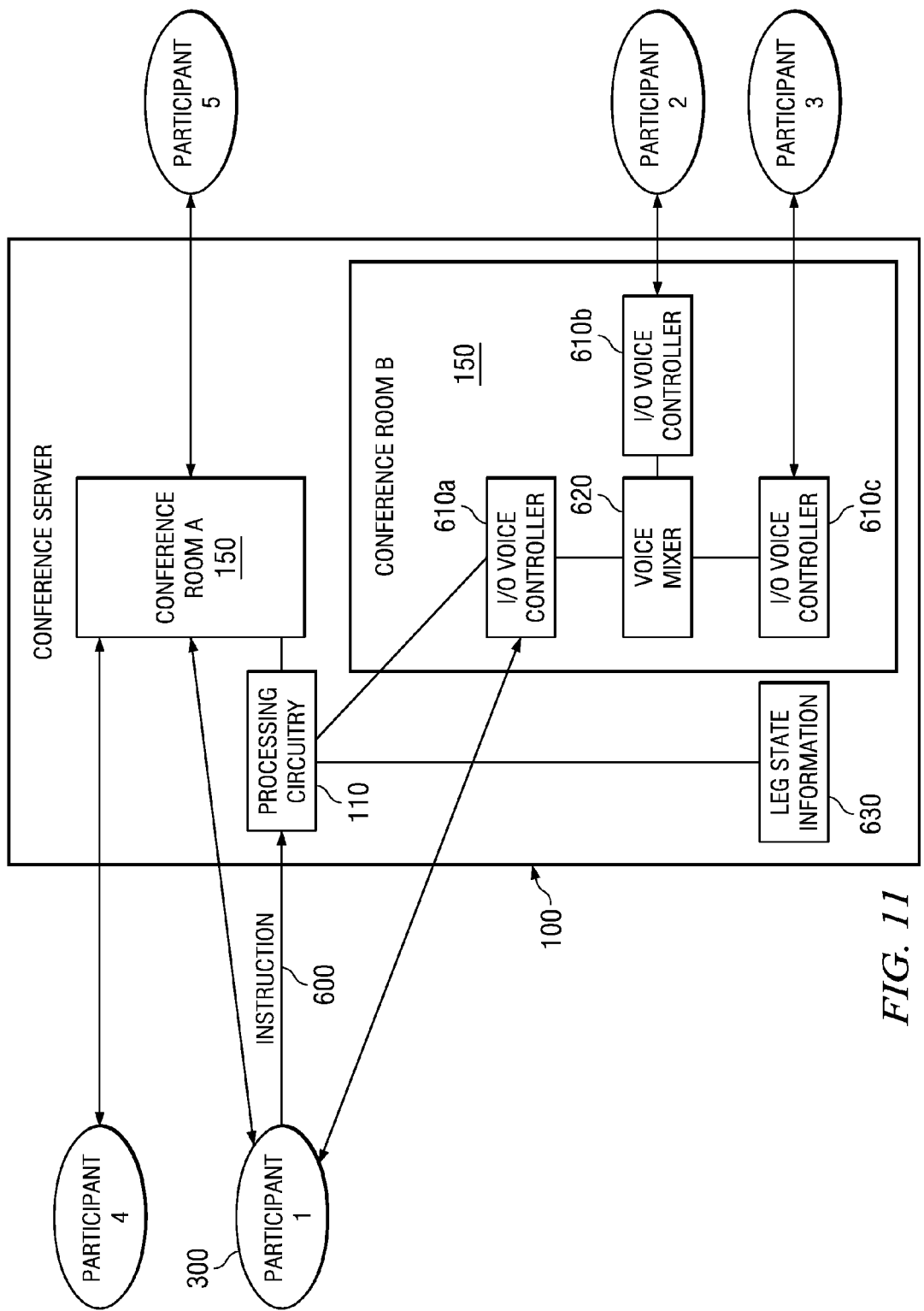
FIG. 11 illustrates an exemplary operation of the conference server to control leg states of conference legs in accordance with embodiments of the present invention.

FIG. 11 illustrates an exemplary operation of the conference server 100 to control participant voice mixing states of conference rooms 150 in accordance with embodiments of the present invention. The conference server 100 includes processing circuitry 110 and multiple conference rooms 150, of which two are shown (Conference Room A and Conference Room B). Each conference room 150 is responsible for managing a different conference call involving different participants 300. For example, Conference Room A is managing a conference call between Participant 1, Participant 4 and Participant 5, while Conference Room B is managing a conference call between Participant 1, Participant 2 and Participant 3.

Each conference room 150 includes a respective I/O voice controller 610 for each participant and a voice mixer 620. For example, in Conference Room B, there is an I/O voice controller 610*a* for Participant 1, an I/O voice controller 610*b* for Participant 2 and an I/O voice controller 610*c* for Participant 3. Each I/O voice controller 610 operates to mute or un-mute speech to/from that participant. The voice mixer 620 operates to produce a particular combination of speech for each participant based on the voice mixing state of the conference room 150.

The voice mixing state of one or more conference rooms is determined based on an instruction 600 sent by one of the participants (here, Participant 1). For example, the instruction 600 can be sent in response to Participant 1 depressing a GPTC button on his/her communications device. The processing circuitry 110 receives and processes the instruction 600 and determines the current voice mixing state of one or more conference rooms based on the instruction 600.

The current voice mixing state of a particular conference room is maintained as part of leg state information 630 stored within the conference server 100. The leg state information 630 identifies the current leg state of each conference leg associated with each conference room 150 within the conference server 100. The conference rooms 150 have access to the leg state information 630 to set and/or determine the current state of each conference leg during the conference call.

For example, in one embodiment, the leg state of a particular conference leg indicates whether voice originated by the participant associated with that conference leg is to be muted or un-muted. In another embodiment, the leg state of a particular conference leg indicates whether voice received at the conference room managing that conference leg is to be muted or un-muted towards the participant associated with that conference leg. In yet another embodiment, the leg state of a particular conference leg indicates whether that conference leg is currently connected to a conference room for voice or data (e.g., the voice/data conference leg is active or inactive/dropped). In still a further embodiment, the leg state of a particular conference leg indicates the gain to be applied to voice received from the participant associated with that leg as heard by one or more other participants in the conference call.

Figure 12:
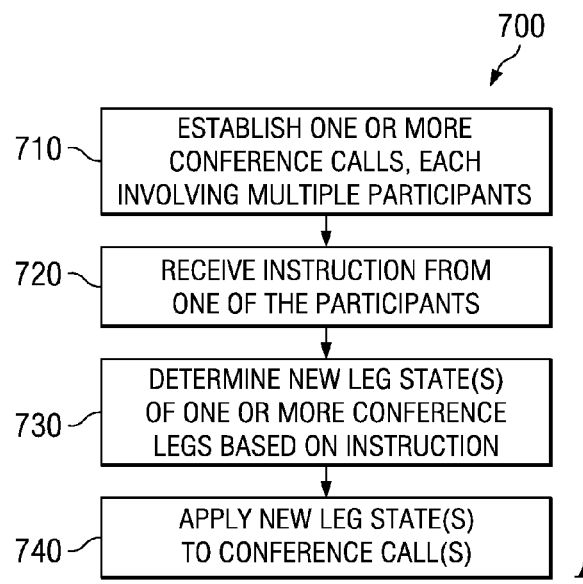
FIG. 12 is a flowchart illustrating an exemplary process for controlling the leg states of conference legs in accordance with embodiments of the present invention.

FIG. 12 is a flowchart illustrating an exemplary process 700 for controlling the leg states of conference legs, in which each conference leg is associated with one of a plurality of participants involved in conference calls, in accordance with embodiments of the present invention. The process begins at step 710, where one or more conference calls, each involving multiple participants with respective conference legs, are established. At step 720, an instruction is received from one of the participants, which is used to determine new leg states for one or more participants involved in one or more conference calls at step 730. Finally, at step 740, the new leg states are applied to the appropriate conference calls.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A conference server, comprising:
   a first interface communicatively coupled to a first external radio adapter within a first radio network including a first group of two or more two-way radio devices, the first external radio adapter being physically connected to a first coupled two-way radio device of the two-way radio devices within the first group;
   a second interface communicatively coupled to a second external radio adapter within a second radio network including a second group of two or more two-way radio devices, the second external radio adapter being physically connected to a second coupled two-way radio device of the two-way radio devices within the second group;
   a conference room operable to manage a conference call between said two-way radio devices of said first group and said second group by receiving, at any given time, voice streams originated by one of said two-way radio devices of said first group via said first external radio adapter and said first interface and one of said two-way radio devices of said second group via said second external radio adapter and said second interface and transmitting said voice streams received from said first external radio adapter via said first interface to said second external radio adapter via said second interface for transmission by said second external radio adapter to said two-way radio devices within said second group via said second coupled two-way radio device and said voice streams received from said second external radio adapter via said second interface to said first external radio adapter via said first interface for transmission by said first external radio adapter to said two-way radio devices within said first group via said first coupled two-way radio device;
   processing circuitry operable to create said conference room for said conference call and communicatively coupled to said conference room, said first interface and said second interface to transmit, receive and process said voice streams managed by said conference room during said conference call; and
   an application program interface communicatively coupled to receive an instruction to create said conference room.

2. The conference server of claim 1, wherein said first external radio adapter is configured to convert said voice streams between a first format associated with said first radio network and a second format associated with said conference server.

3. The conference server of claim 2, wherein said second external radio adapter is configured to convert said voice streams between a third format associated with said second radio network and said second format.

4. The conference server of claim 1, further comprising:
   a conferencing software module executable by said processing circuitry to create and manage said conference room; and
   a memory device within which said conference room is created.

5. The conference server of claim 4, wherein said conferencing software module is further operable to create and manage said conference rooms in parallel.

6. The conference server of claim 5, wherein said processing circuitry is further operable to process and transmit different types of media for each of said conference rooms, wherein said different types of media include said voice streams and data.

7. The conference server of claim 6, wherein said data includes text and multi-media that enables data collaboration between voice participants associated with said other devices, said data collaboration providing one or more of instant messaging, presentation sharing, desktop sharing and video.

8. The conference server of claim 1, further comprising:
   a third interface communicatively coupled to a telephone network including one or more telephone devices, said conference room managing said conference call between said first group, said second group and said one or more telephone devices.

9. The conference server of claim 8, wherein said third interface provides an interface to one or more circuit-switched networks and one or more packet-switched networks.

10. The conference server of claim 9, wherein said telephone network includes one or more of the Public Switched Telephone Network (PSTN), Public Land Mobile Network (PLMN), a private Local Area Network (LAN) and a public Internet Protocol (IP) network.

11. The conference server of claim 8, wherein said one or more telephone devices include one or more of a PSTN telephone, a cellular telephone, an IP telephone, a computer and a personal digital assistant.

12. The conference server of claim 1, wherein said application program interface is communicatively coupled to receive said instruction to create said conference room in response to a triggering of an alarm as a result of the occurrence of an external event.

13. The conference server of claim 1, further comprising:
   a conference policy maintaining parameters for one or more of creating said conference room, establishing said conference call and managing said conference room.

14. The conference server of claim 13, wherein said conference policy includes leg state information identifying a respective leg state of each conference leg of said conference call, each conference leg being associated with one of said first group or said second group.

15. A communications system providing conferencing services, comprising:
   a first radio adapter within a first radio network including a first group of two or more two-way radio devices for converting voice between a first format associated with said first radio network and a second format associated with a second network, said first radio adapter being physically connected to a first coupled two-way radio device of the two-way radio devices within the first group;
   a second radio adapter within a second radio network including a second group of two or more two-way radio devices for converting voice between a third format associated with said second radio network and said second format, said second radio adapter being physically connected to a second coupled two-way radio device of the two-way radio devices within the second group; and a conference server within said second network and communicatively externally coupled to said first radio adapter and said second radio adapter, said conference server being operable to create a conference room for managing a conference call involving said first group and said second group;

wherein said conference room is operable to receive, at any given time, voice streams originated by one of said two-way radio devices of said first group and one of said two-way radio devices of said second group during said conference call and to transmit said voice streams received from said first radio adapter to said second radio adapter for transmission by said second radio adapter to said two-way radio devices within said second group via said second coupled two-way radio device and said voice streams received from said second radio adapter to said first radio adapter for transmission by said first radio adapter to said two-way radio devices within said first group via said first coupled two-way radio device.

16. The communications system of claim 15, wherein said conference server includes a conferencing software module operating to create multiple conference rooms in software.

17. The communications system of claim 16, wherein said conference server manages said conference call between said first group, said second group and one or more telephone devices communicatively coupled to said conference server via a telephone network; and wherein said conference server is further operable to process and transmit different types of media for each of said conference rooms, wherein said different types of media include said voice streams and data that enables data collaboration between voice participants associated with said telephone devices.

18. The communications system of claim 15, wherein said first radio adapter and said second radio adapter are physically located within a single hardware chassis.

19. The communications system of claim 15, further comprising:

an additional conference server including an additional conference room that is communicatively coupled to both additional communications devices and to said conference room within said conference server for said conference call.

20. A method for conferencing two-way radio and telephone devices, comprising the steps of:

receiving an instruction to establish a conference call involving a first group of two-way radio participants and a second group of two-way radio participants;

creating a conference room for said conference call;

establishing a connection between said conference room and a respective external radio adapter within a respective radio network, each containing two or more two-way radio devices associated with one of said first and second groups of said two-way radio participants, each said external radio adapter being physically connected to a respective coupled two-way radio device of the two-way radio devices associated with the respective one of the first and second groups;

receiving, at any given time, voice streams originated by one of said two-way radio devices of said first group and one of said two-way radio devices of said second group via said respective radio adapters during said conference call;

transmitting said received voice streams originated by said first group to said radio adapter associated with said second group for transmission to said two-way radio devices of said second group via said conference room and said respective coupled two-way radio device; and transmitting said received voice streams originated by said second group to said radio adapter associated with said first group for transmission to said two-way radio devices of said second group via said conference room and said respective coupled two-way radio device.

21. The method of claim 20, wherein each said radio adapter operates to convert said voice streams between a respective format associated with said respective radio network and a second format associated with said conference room.

22. The method of claim 20, wherein said creating said conference room further comprises:

executing a conferencing software module to create and manage said conference room.

23. The method of claim 22, wherein said step of executing said conferencing software module further comprises the step of:

executing said conferencing software module to create and manage multiple conference rooms in parallel.

24. The method of claim 23, further comprising:

establishing a connection between said conference room and telephone devices associated with telephone participants, said telephone devices being coupled to said conference room via a telephone network; and wherein said step of transmitting said voice streams further comprises the step of:

processing and transmitting one or more types of media for each of said conference rooms, wherein said types of media include said voice streams and data that enables data collaboration between said respective telephone participants.

25. The method of claim 20, wherein said step of receiving said instruction further comprises the step of:

receiving said instruction to create said conference room in response to a triggering of an alarm as a result of the occurrence of an external event.

26. The method of claim 20, further comprising the step of:

controlling respective conference leg states of said two-way radio devices of said first group and said second group.

27. The communications system of claim 15, wherein said first radio adapter is configured to simultaneously receive said voice streams originated from one of said two-way radio devices within said first group via said first coupled two-way radio device and transmit said voice streams originated from one of said two-way radio devices within said second group to said two-way radio devices within said first group via said first coupled two-way radio device, such that said voice streams originated from said first group and said second group are simultaneously received at said remaining ones of said two-way radio devices within said first group.

* * * * *